US010180848B1

(12) United States Patent
Sharifi Mehr

(10) Patent No.: US 10,180,848 B1
(45) Date of Patent: Jan. 15, 2019

(54) DYNAMIC RENDERING OF USER INTERFACES

(71) Applicant: AMAZON TECHNOLOGIES, INC., Seattle, WA (US)

(72) Inventor: Nima Sharifi Mehr, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 511 days.

(21) Appl. No.: 14/952,596

(22) Filed: Nov. 25, 2015

Related U.S. Application Data

(63) Continuation of application No. 13/944,503, filed on Jul. 17, 2013, now Pat. No. 9,235,429.

(51) Int. Cl.
G06F 9/451 (2018.01)
G06F 17/22 (2006.01)
H04L 29/08 (2006.01)
H04L 29/06 (2006.01)

(52) U.S. Cl.
CPC .......... *G06F 9/451* (2018.02); *G06F 17/2247* (2013.01); *G06F 17/2288* (2013.01); *H04L 67/02* (2013.01); *H04L 67/22* (2013.01); *H04L 67/42* (2013.01)

(58) Field of Classification Search
CPC .. G06F 17/2288; G06F 17/2247; G06F 9/451; H04L 67/02; H04L 67/22; H04L 67/42
See application file for complete search history.

(56) References Cited

U.S. PATENT DOCUMENTS

| 7,620,894 B1 | 11/2009 | Kahn | |
|---|---|---|---|
| 2009/0282021 A1* | 11/2009 | Bennett | G06F 17/30648 |
| 2012/0042280 A1* | 2/2012 | Hoffman | G06F 17/30867 |
| | | | 715/800 |
| 2012/0278179 A1 | 11/2012 | Campbell et al. | |
| 2014/0344727 A1 | 11/2014 | Chaudhry | |

OTHER PUBLICATIONS

Casillas, Roland J., "Notice of Allowance dated Sep. 14, 2015", U.S. Appl. No. 13/944,503, The United States Patent and Trademark Office, Sep. 14, 2015.
Casillas, Roland J., "Non-Final Office Action dated Mar. 26, 2015", U.S. Appl. No. 13/944,503, The United States Patent and Trademark Office, Mar. 26, 2015.

\* cited by examiner

*Primary Examiner* — Roland J Casillas
(74) *Attorney, Agent, or Firm* — Lindauer Law, PLLC

(57) ABSTRACT

Described are techniques for determining features to be presented in a user interface based on the times that users spent viewing previous webpages or other user interfaces. A data structure associating user viewing times with the count, size, color, or other features of the elements presented in the previous user interfaces may be generated. Based on this data structure and a target viewing time, a set of user interface features to be presented in a subsequent user interface may be selected.

20 Claims, 9 Drawing Sheets

DYNAMIC RENDERING OF USER INTERFACES

PRIORITY

This application is a continuation of, and claims priority to, pending U.S. patent application Ser. No. 13/944,503 filed on Jul. 17, 2013, entitled "Dynamic User Interface Rendering". The entirety of this previously filed application is hereby incorporated by reference.

BACKGROUND

A server or other device provides webpages or other user interfaces to various types of client devices. Users of those client devices view the webpages and the respective content. The content may support e-commerce businesses, manufacturers, special interest groups, and other entities. Such entities seek to make their webpages more effective, informative and engaging with respect to target users.

Figure 1:
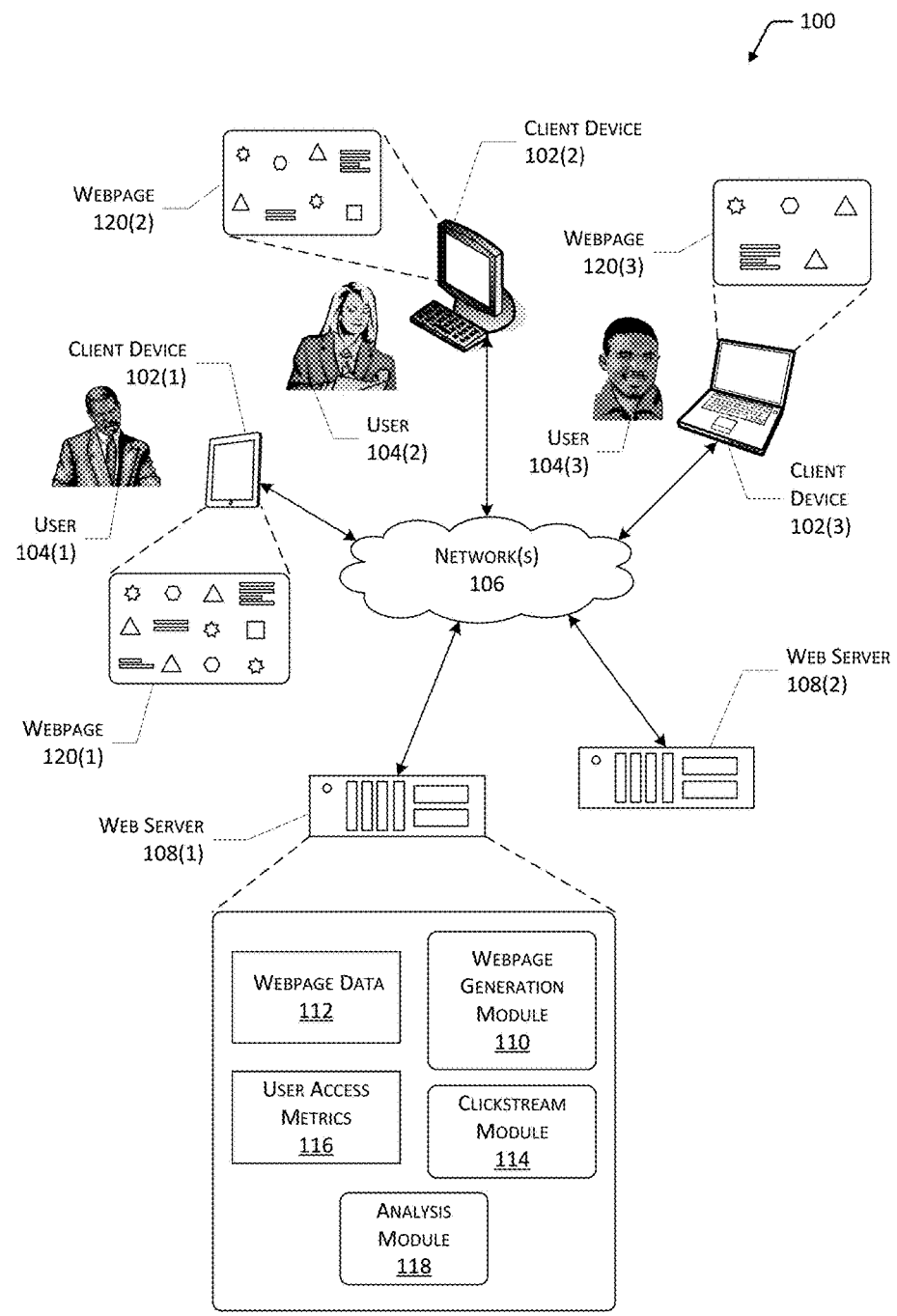
FIG. 1 is a block diagram of a system configured to provide webpages generated using clickstream data, which includes information indicative of client devices and web servers communicating with each other via one or more networks.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Users access or browse various user interfaces such as webpages, e-commerce shopping sites, and so forth, using laptop computers, e-book readers, tablets, smart phones and other client devices. The particular sequence that a user takes while accessing a number of different webpages is known as a clickstream. Different users may access the same webpages by respectively varying sequences. Conversely, a particular user may repeat a given sequence (i.e., clickstream) numerous times. Thus, webpages may be accessed by way of numerous routes or pathways. Accessing a webpage may also refer to a communications session between a web server and the client device associated with a user.

Several illustrations are depicted and described herein using e-commerce related-webpages in the interest of clarity. However, the methods, devices and resources described herein may be applied to user interfaces related to industrial process control, banking, health care, security or police services, military operations, and many other areas of endeavor.

Respective users spend varying amounts of time viewing any particular webpage. Additionally, the same user may access the same webpage numerous times, spending different amounts of time during each visit. In some instances, a user accesses a webpage and departs therefrom (i.e., navigates away, or moves on to another webpage) before all of the elements have been fully rendered or presented to the user. Such elements may include, without limitation: user interface elements; images; text; tables; audio files; and so on. Elements may also include hidden (or embedded) portions of code that cause various actions to be performed by the client device. Thus, elements included in a webpage may include visible (visual) elements, audible (audio) elements, embedded functional elements, and so forth.

Clickstream data refers to information that corresponds to or describes a user's access to one or more webpages or user interfaces. For a non-limiting example, clickstream data may include one or more of: a time spent by a user accessing a webpage; the number of elements included on a webpage; the number of elements rendered on a webpage before a user moved on; an access bandwidth corresponding to a user; an identity of a user; and so forth. Processing clickstream data may provide numerous types of user access metrics—that is, factors or quantities indicative of user interest or engagement in a webpage or sequence of webpages. In turn, a data structure or other data structure can be populated with such user access metrics. Respective data structures may be specific to the webpages provided by a particular server, comprehensive of the webpages provided by multiple different servers, inclusive of user access metrics for a multitude of users, and so on.

Various factors influence the amount of time—and presumably, attention—that a user spends accessing a particular webpage (i.e., viewing images, listening to audio content, and so on). User familiarity with that webpage, expectations as to the amount or type of content that is presented, use of the webpage as a "stepping stone" to another webpage, and so forth, may cause a user to spend less time on a given webpage than anticipated or desired by the designer. Some factors are linked to the specific user or their circumstances, such as the bandwidth (communicational speed) of their webpage access service, or the time-critical or attention-focused nature of their webpage access goals.

In one example, a user is seeking a part for a garden tractor through a sequence (clickstream) of vendor webpages that progressively focus in on the needed component. Such a user may be concentrating upon correct identification of the part, and elements that are not directly related to that goal may be distracting and annoying—perhaps to the extent that the user abandons the website and seeks another vendor. Thus, too much or extraneous webpage content may result in lost sales.

In another example, a user is browsing for a gift at a website. The user's clickstream has directed their search to earrings, and then narrowed the search to pearl earrings. A webpage presenting four different pairs of pearl earrings may capture the user's attention for at least a few minutes while they visually examine respective fine details. Such a webpage may be an effective place to present sales information, loss or damage insurance options, or other information due to the relatively longer viewing time anticipated of the user by the webpage designers. Thus, the webpage access habits, expectations or interests of a particular user, or a group of users having some interest in common, in association with the primary purpose of a given webpage, are among the factors leading to specific user access metrics. Such user access metrics may be analyzed in the interest of improved webpage effectiveness and greater user engagement with the presented content.

A client device and a web server may be configured to perform respective functions for acquiring clickstream data and processing that data to identify or quantify various user access metrics. For example, a web server may identify a particular user that has accessed one or more hosted webpages in the past. The web server may also record a timestamp when the user begins accessing a first webpage, and record analogous timestamps for other webpages that the user accesses during their visit.

The client device may provide data indicating the number or specific identity of elements rendered on the client device for a given webpage before the user advanced to a next webpage, and so on. In this way, access times, rendered content information, or other webpage access (i.e., viewing) characteristics may be acquired for a particular user by way of the corresponding clickstream data. These and other operations may be performed so as to accumulate user access metrics corresponding to one user, many users, one or many webpage access sequences, and so forth.

Webpages having particular element counts or placements, limited or narrowly tailored content types, varying elemental or visual complexities, or other characteristics, may be generated specifically for a particular user, improved for a general audience of users, or in view of other criteria or goals. In general, user access metrics may be used to generate user interfaces, such as webpages, based on immediately acquired information, heuristic or statistical analysis of accumulated information, or in accordance with other methods or schemes.

FIG. 1 depicts views 100 of an illustrative system. Client devices 102(1), 102(2) and 102(3) are associated with user 104(1), 104(2) and 104(3), respectively. Each of the illustrative client devices 102(1)-102(3) has resources configured to access various webpages according to user 104(1)-104(3) inputs and selections. For example, the client device 102(1) is depicted in the form of an e-reader device and is configured to display electronic books ("e-books"), browse online shopping or news sites, or access other web-based material.

In turn, the client device 102(2) is in the form of a desktop computer and is configured to access websites or other online material, perform various business or technical functions in accordance with software programming, and so forth. The client device 102(3) is depicted as a laptop computer equipped and configured so as to access webpages and to display their respective contents. The respective client devices 102(1)-102(3) may have a display or touch-sensitive display, auditory or haptic resources, a keyboard or mouse, configuration to present a virtual keyboard, and so on, used for user input/output of information.

Specific client devices and their respective resources are cited within a given example for purposes of clarity and generally without limitation. Additionally, a system of three client devices 102(1)-102(3) is depicted for clarity, but other systems having (or hosting) any respective number of client devices 102 configured to selectively access web-based information and content are contemplated.

The client devices 102 are configured to communicate with each other or other entities by way of one or more networks 106. The one or more networks 106 can include the Internet (or access thereto), local area networks (LANs), wide area networks (WANs), and so on. Wired connections, wireless communication or other suitable signaling infrastructure or formats may be used.

Respective web servers 108(1) and 108(2) are configured to communicate with the client devices 102 using the one or more networks 106. The web servers 108 generate and provide respective webpages that are accessible (i.e., viewable) by the client devices 102 in accordance with selection or access input from the respective users 104. In one non-limiting example, the web server 108(1) is operated by an office supply e-commerce retailer and generates webpages related to office consumables, furniture, equipment and similar merchandise. In another example, the web server 108(2) is operated by an e-commerce business and generates webpages corresponding to a broad range of consumer offerings, such as books, audio/video media, downloadable audio or video material, jewelry, crafts and hobby supplies, household or kitchen items, and so forth.

For purposes of non-limiting illustration, the web server 108(1) includes a webpage generation module 110. The webpage generation module 110 uses webpage data 112 stored within the web server 108(1) to generate (i.e., construct, or define) webpages having elements that may be rendered and presented to a user 104. The webpage generation module 110 may include electronic circuitry, machine-readable program code, or other resources or constituency. In turn, the webpage data 112 may include, but is not limited to, digital image files, photographic images, textual information, graphs, charts, tables of numeric or alphanumeric information, and so on.

The webpage generation module 110 may be configured to select elements stored within the webpage data 112 and to position, scale, place, modify coloring or perform other functions such that a corresponding webpage is generated. Such a webpage may then be communicated as encoded information to one or more of the client devices 102(1)-102(3), where it is rendered for (displayed to) the corresponding user 104(1)-104(3).

The webpage generation module 110 may also be configured to generate one or more webpages, using the webpage data 112, based upon predefined templates or layouts. For example, certain webpages having particular elements and arrangements may be presented repeatedly to a multitude of different users 104. Thus, respective templates may be used in generating such webpages according to established patterns or protocols.

The web server 108(1) may also include a clickstream module 114. The clickstream module 114 may be configured to acquire clickstream data descriptive of a user's 104(1)-104(3) access to a webpage or sequence of webpages generated by the web server 108(1). The clickstream module 114 may include any suitable resources such as, for non-limiting example, electronic circuitry, machine-readable program code, and so forth.

The clickstream module 114 may also be configured to parse or process such clickstream data to derive various user access metrics 116 stored within the web server 108(1). The user access metrics 116 may be used to populate one or more data structures, reformatted or transposed into different coding schemes, and so on. The user access metrics 116 may include times spent by a user 104 viewing respective webpages, the number of elements included in those webpages, or the respective contents or configurations of the webpages. The user access metrics 116 may also include the client device 102 type or access bandwidth associated with the user 104, information analogous to the foregoing regarding multiple users 104, or many other factors and parameters.

The web server 108(1) may also include an analysis module 118 configured to perform various analysis of the user access metrics 116. The analysis module 118 may be configured to perform statistical or heuristic analysis, filtering, derivation of metadata, pattern detection, functional curve fitting, or other operations using the user access metrics 116. The analysis module 118 may also be configured to report or provide the results of such operations to the webpage generation module 110 for use in generating one or more webpages, modification of existing webpage templates, or for other purposes.

As depicted, the client devices 102(1)-102(3) have rendered and are displaying respective webpages 120(1), 120(2) and 120(3). Each of the webpages 120(1)-120(3) was generated and provided by the web server 108(1). The webpage 120(1) including 12 elements (elements), while the webpage 120(2) includes 8 elements and the webpage 120(3) has 5 elements. The particular elements and their configurations are illustrative and simplified in the interest of clarity. However, it is noted that the elements of the webpages 120(2) and 120(3) are respective subsets of the elements of the webpage 120(1). Further description in this regard is provided below.

For illustrative example, the user 104(1) uses the client device 102(1) to access the web server 108(1), seeking information regarding printer ink cartridges. The client device 102(1) provides data to the web server 108(1) having user 104(1) input about a particular brand of printer. The webpage generation module 110 selectively retrieves 12 elements from the webpage data 112 in accordance with the printer brand, such as photographic images of different ink cartridges, text regarding different ink colors or volumetric capacities, or other options and information. The retrieved elements are then used by the webpage generation module 110 to generate the webpage 120(1), which is provided to the client device 102(1) where it is rendered for display to the user 104(1). Similar operations may be performed resulting in the generation, provision and display of the webpage 120(2) and 120(3) to the users 102(2) and 102(3), respectively.

Clickstream data regarding the amount of time each of the users 102 views (accesses) the respective webpages 120(1)-120(3), the particular elements included thereon, the number of those elements rendered for each webpage 120(1)-120(3) before a user 102(1)-102(3) moves on, and so forth, may be acquired by the clickstream module 114. The clickstream module 114 may then be parsed or processed (or both) in order to derive or quantify respective metrics stored as (or with) the user access metrics 116. The user access metrics 116 may be analyzed by the analysis module 118 and the results used by the webpage generation module 110 during the generation of similar webpages, user-targeted webpages, or other webpages on an immediate or future basis.

The respective client devices 102 and web servers 108 may be collectively referred to as computing devices. Most or all of the numerous illustrative actions described herein can be performed by or using any one of the computing devices. That is, any particular client device 102 or web server 108 may be configured to acquire clickstream data, derive user access metrics 116, generate webpages 120 or user interfaces using the user access metrics 116, and so forth. Additionally, the operations or functions described herein may be distributed over (or performed by) a plurality of different computing devices and the respective efforts of each combined toward an end result.

For example, the client device 102(1) may receive user access metrics 116 from the web server 108(1), which are then used to generate webpages or other user interfaces for presentation to the user 104(1), and so on. In another example, the web server 108(2) includes resources so as to generate and render user interfaces using operations normally performed by a web browser of the client device 102(3). Other variations or operations may also be performed.

Figure 2:
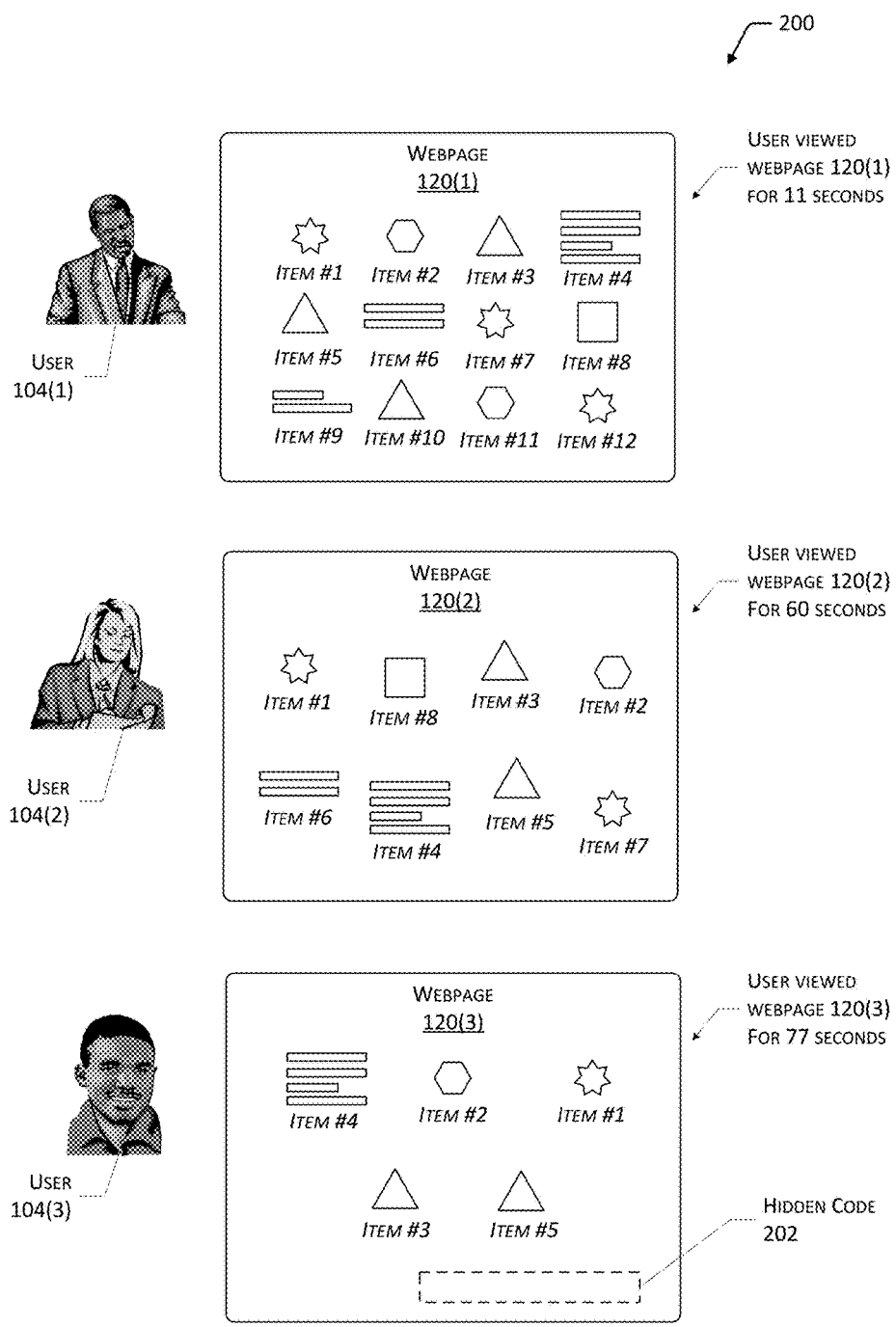
FIG. 2 illustrates three respective webpages having varying numbers of elements.

FIG. 2 depicts a view 200 including the webpages 120(1), 120(2) and 120(3). The view 200 depicts particular user 104(1)-104(3) reactions or responses to the webpages 120(1)-120(3) as respectively presented to each. The view 200 is illustrative and non-limiting in nature, and other user responses to other webpage configurations, elemental counts, and so forth are contemplated.

In one example, the user 104(1) is presented with the webpage 120(1) having 12 elements respectively designated Item #1, Item #2, in order through Item #12. Certain elements, such as Item #1, Item #3 and Item #7 are depicted as graphic images, while others such as Item #4 and Item #6 are depicted as text blocks. Simplified representational icons are depicted for each Item #1-Item #12 in the interest of clarity, but actual rendered (presented) elements may be any suitable thing such as photographic images, text or numeric values, verbal or musical audio files, and the like.

Continuing with the present example, the user 104(1) then viewed the webpage 120(1), fully rendered, for a total of 11 seconds before access (viewing) was ended. The user 104(1), for purposes of the present example, judged the webpage 120(1) to be cluttered and confusing, having too many elements for useful comparison, or requiring too much time to grasp the overall informational content. The user 104(1) thereafter ended access to the web server 108(1), at least for purposes of the present access session. In any case, the webpage 120(1) was presented to the user 104(1) for a relatively brief period and was abandoned by virtue because of too much elemental content.

In another example, the user 104(2) is presented with the webpage 120(2) having 8 elements including the same Item #1-Item #8 as presented on the webpage 120(1). The user 104(2) viewed the fully rendered webpage 120(2) for a total of 60 seconds before ending access. In the present example, the user 104(2) found the webpage 120(2) to be inclusive of sufficient information and elemental content to make a buying decision. The user 104(2) then clicked on the element of Item #3, thereby advancing to another webpage specific to Item #3, and ultimately placing an order for the corresponding merchandise (e.g., an ink cartridge) through the web server 108(1).

In yet another example, the user 104(3) is presented with the webpage 120(3) that includes 5 visible elements—namely, Item #1-Item #5 as presented on the webpages 120(1) and 120(2). The webpage 120(3) further includes a hidden code 202 element, which is not visible to the user 104(3) but may be configured to trigger presentation of another element, present an animation, play an audio file, or perform various other actions. Thus, the hidden code 202 may be javascript or other machine-executable code. The user 104(3) viewed the fully rendered webpage 120(3) for a total of 77 seconds before access was ended. In this present example, the user 104(3) spent appreciable time studying the similarities and differences between the Item #1-Item #5

(e.g., ink cartridge images and corresponding information). The user 104(3) then selected Item #2 by mouse clicking input, placing an order for the corresponding merchandise.

In the illustrative examples above, the users 104(1)-104(3) spent different amounts of time viewing the respective webpages 120(1)-120(3). Differing element counts (i.e., 12, 8 and 5) resulted in considerably varied user impressions, suitability to individual purposes, and end results—sale or no sale of merchandise, respectively. Within the context of the foregoing three examples, fewer elements within a webpage resulted in greater user satisfaction and engagement.

The clickstream module 114 may acquire clickstream data indicative of each of the webpage 120(1)-120(3) access events, and process that data so as to populate or add to the user access metrics 116. For instance, the user access metrics 116 may indicate that the user 104(1) accessed the webpage 120(1), which included 12 particular elements, that such webpage was fully rendered, and that access ended 11 seconds after full rendering. Similar user access metrics 116 may also be derived from clickstream data for the users 104(2) and 104(3).

The analysis module 118 may access the user access metrics 116 corresponding to the webpages 120(1)-120(3) access events, performing statistical operations, heuristic functions or comparisons, and so on. The analysis module 118 may then provide the results, or directives based on those results, to the webpage generation module 110 for use in other webpage rendering. For example, the analysis module 118 may determine that future webpage generations should not include more than eight elements corresponding to the Item #1-Item #12, and provide a corresponding directive or template to the webpage generation module 110.

In another example, the analysis module 118 may identify that the user 104(3) placed an order during 75% of all previous webpage access events that included six or fewer elements. The analysis module 118 may then direct the webpage generation module 110 to the effect that future webpages provided to the user 104(3) are limited to six or fewer elements. Any number of other operations stemming from the user access metrics 116 can also be performed.

Various illustrative webpages have been depicted and described thus far. However, the apparatus and methods described herein may also be applied in the context of other types of user interface. For example, the user 104(2) may navigate through a particular sequence of user interfaces related to controlling a process within a manufacturing context. Control-related user interfaces may include process variable displays, user-adjustable setpoint or alarm threshold controls, and so forth.

User access metrics 116 may be derived from clickstream data corresponding to these respective user interfaces. Analysis of such user access metrics 116 may indicate that process errors occur more frequently when user interfaces having 8 or more visual elements are generated and presented. Thus, the underlying process runs better and product quality is improved if control-related user interfaces having 7 or fewer visual elements are generated.

Figure 3:
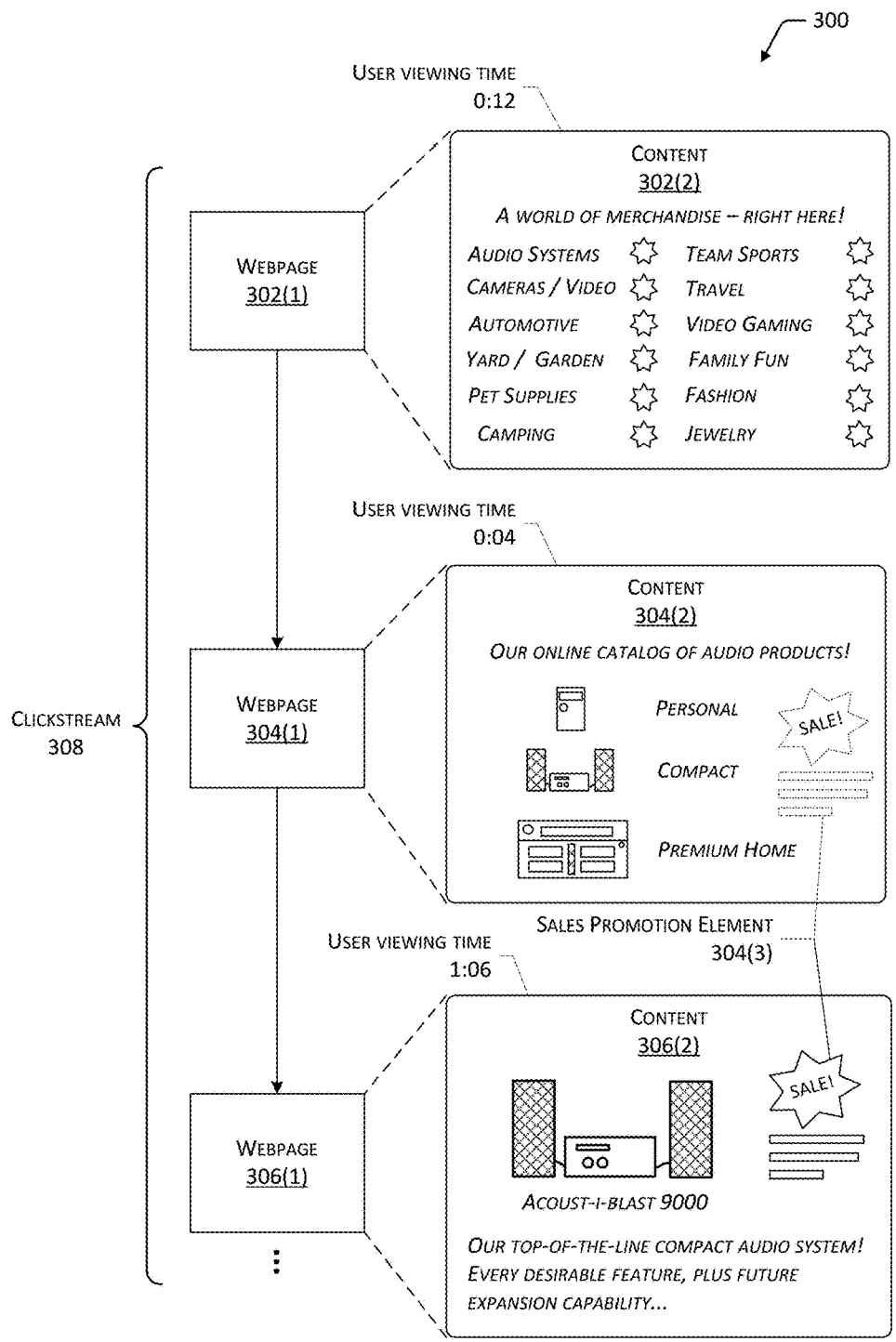
FIG. 3 illustrates a clickstream depicting a sequence of webpages accessed by a user.

FIG. 3 depicts views 300 of respective webpages 302(1), 304(1) and 306(1). The webpages 302(1)-306(1) are accessed in a sequential order defining a clickstream 308. Specifically, the clickstream 308 indicates that a user (e.g., 104(3)) accessed the webpage 302(1) first, then moved (or advanced) to the webpage 304(1) second, and thereafter moved on to the webpage 306(1). Thus, the clickstream 308 is indicative of, among other things, three particular webpages accessed in a specific order. For purposes of a present example, the webpages 302(1), 304(1), and 306(1) are generated and provided by the web server 108(1), and are accessed by the user 104(3) using the client device 102(3).

The webpage 302(1) includes illustrative content 302(2). As depicted, the content 302(2) includes 13 distinct elements, including a promotional statement and links to 12 different categories of merchandise. From one perspective, the content 302(2) may define a "landing page" for an e-commerce (online shopping) venue of the web server 108(1). The user 104(3) spends a total of 12 seconds (i.e., 0:12) accessing or viewing the content 302(2), after which time the user 104(3) clicks on the "Audio Systems" link and advanced to the webpage 304(1).

Clickstream 308 data related to the user 104(3) access to the webpage 302(1) may be acquired by the clickstream module 114 and processed to derive corresponding metrics to be added to (stored with) the user access metrics 116. In the present example, such user access metrics 116 may now include the user 104(3) identity, the particular webpage 302(1), the element count of 13 of the content 302(2), the user 104(3) viewing (access) time of 12 seconds, or other metrics or information. The clickstream data and corresponding metrics may be provided immediately to the webpage generation module 110 or stored for later use, and so on.

The webpage 304(1) includes illustrative content 304(2). The content 304(2) includes a promotional statement and 3 photographic images with links to 3 different sub-categories of audio electronics merchandise, which were rendered in 4 seconds while the user 104(3) remained at the webpage 304(1). However, the user 104(3) then clicked on the "Compact" audio systems link and advanced to the webpage 306(1). As a result, a sales promotion element 304(3), which was configured to be included in the content 304(2), was not rendered before the user 104(3) left the webpage 304(1).

Clickstream 308 data descriptive of the webpage 304(1) access event may be acquired by the clickstream module 114 and processed such that corresponding metrics are added to the user access metrics 116. In the present example, such user access metrics 116 may now include the user 104(3) identity, the particular webpage 304(1), the rendered element count of 5 of the content 304(2), indication of the un-rendered element 304(3), the user 104(3) access time of 4 seconds, or other metrics. In this example, the clickstream data and corresponding metrics are provided immediately to the webpage generation module 110 as a result of the un-rendered sales promotion element 304(3).

The webpage 306(1) includes illustrative content 306(2). The content 306(2) includes a merchandise label, a photographic image of a particular compact audio system, and promotional information regarding the particular merchandise. Additionally, the sales promotion element 304(3) was included (moved forward) and fully rendered as part of the content 306(2). The user 104(3) remained to view the content 306(2) for a total of 1 minute and 6 seconds (i.e., 1:06) and then, presumably satisfied with the information obtained through the elements, ended access to (exited from) the web server 108(1).

Clickstream 308 data descriptive of the webpage 306(1) access event may be acquired by the clickstream module 114 and processed so that corresponding metrics are added to the user access metrics 116. Thus, such user access metrics 116 may now include the user 104(3) identity, the particular webpage 306(1), a rendered element count of 4 of the content 306(2), verification of the rendered element 304(3), the user 104(3) access time of 1 minutes and 6 seconds, or possibly other data or information.

The clickstream 308 is illustrative of a hypothetical pathway taken by the user 104(3) through a progressive sequence of webpages 302(1)-306(1) in an e-commerce or online-shopping venue. In a first instance, the user 104(3) spent sufficient time at the webpage 302(1) to consider the content 302(2) before making a selection and moving on. Thereafter, the user 104(3) quickly identified the subject matter of interest on the webpage 304(1) and advanced to the webpage 306(1), before all of the intended content 304(2) could be fully rendered (i.e., presented, or actuated).

In response, the un-rendered element 304(3) was detected in the clickstream 308 data by the clickstream module 114, which directed the webpage generation module 110 to include that element in the content 306(2) of the webpage 306(1). Thus, the webpage 306(1) generation was effectively modified in real-time or "on the fly", so as to include material intended but not presented earlier in the clickstream 308. The sales promotion element 304(3) was thus included in the content 306(2), where the user 104(3) spent adequate time to view and consider that information.

Clickstream 308 data, and the various user access metrics derived therefrom, can be used immediately upon acquisition and processing, as well as later during a subsequent visit by the same user 104, accumulated to derive statistical information from a growing population of data, and so on. For example, if numerous other users 104 access the webpage 304(1) and move on quickly without seeing some of the intended elements, the analysis module 118 may cause the webpage generation module 110 to redesign the content 304(2)—with sales promotion or other elements slated for inclusion on other webpages 304. In this way, webpage content may be more effectively tailored to user habits, interests or purposes.

Figure 4:
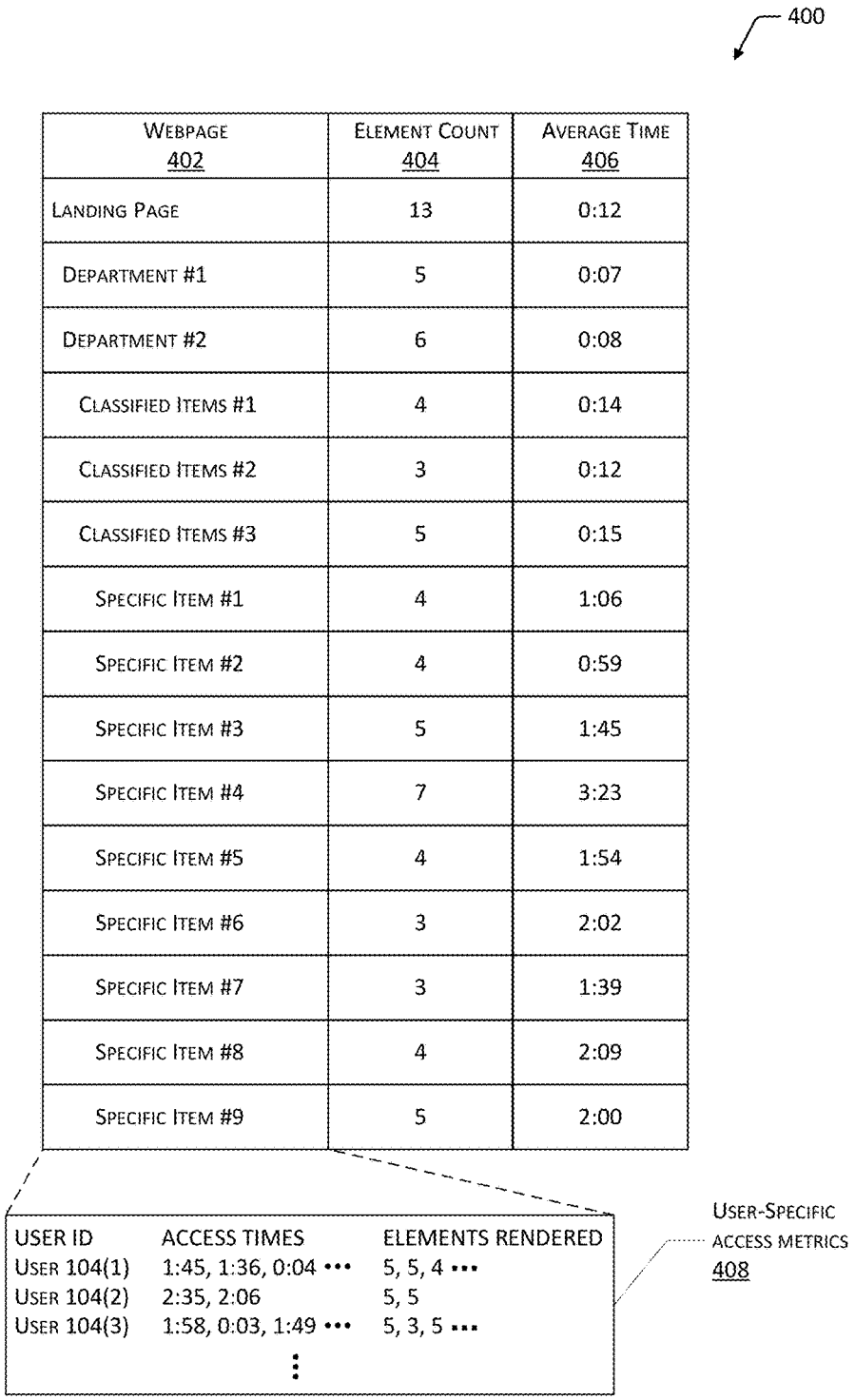
FIG. 4 illustrates a data structure populated using user access metrics derived from clickstream data.

FIG. 4 depicts a data structure 400 of user access metrics 116. The data structure 400 is illustrative and non-limiting in nature, and other data structures, data tables, or the like having respectively varying user access metrics, executable code, linked lists, or information are also contemplated. For purposes of a present example, the data structure 400 includes user access metrics (e.g., 116) derived from numerous clickstreams (e.g., 308), acquired by way of a plurality of different users 104, accessing an e-commerce web server (e.g., 108(1)).

In another example, a data structure may include user access metrics 116 corresponding to just a single user 104. In yet another example, a data structure may include user access metrics 116 pertaining to multiple users 104 accessing multiple different web servers 108. Other data structures inclusive of other user access metrics 116 or derived from different sources may also be used.

The data structure 400 includes a webpage column 402. The webpage column 402 includes webpage identifiers or names for 15 different webpages (e.g., 302(1)) or corresponding templates as used by a web server (e.g., 108(1)). As depicted, the webpage column 402 includes a "Landing Page" webpage identifier, a "Department #1" webpage identifier, and so on. The data structure 400 also includes an element count column 404, which includes counts (numbers) of elements (e.g., 304(3)) included by design in the respective webpages. As depicted, the "Landing Page" webpage includes 13 elements, the "Department #1 Page" includes 5 elements, and so on.

The data structure 400 includes an average time column 406. The average time column 406 includes cumulative average user access times for the respective webpages. As depicted, the "Landing Page" webpage has an average user access time of 12 seconds (0:12), the "Department #1" webpage has an average user access time of 7 seconds (0:07), and so on. In the depicted example, each average user access time is calculated as the statistical average (mean) for a respective number of different users (e.g., 104(2)) accessing the corresponding webpage varying numbers of times. However, other access time-related values or data can also be used, or calculated using different functions, heuristic methods, filtering schemes, and so forth. For example, time-related values such as data-set minimums or maximums, medians, modes, and so on, may be used.

Thus, the data structure 400 is arranged as 15 respective rows, wherein each row includes user access metrics 116 for a respective predefined webpage as hosted by a web server (e.g., 108(1)). The illustrative user access metrics of the data structure 400 are subject to change with time as they are derived at least in part by statistical averaging. Also, additional webpages may be added, existing webpages may be deleted, element counts may change, and so on. Thus, respective data structures may include fixed data, variable data, a combination of fixed and variable data, and so forth, in accordance with the particular user access metrics 116 used to populate a particular data structure.

Further depicted are user-specific access metrics 408 corresponding to the webpage identified as "Specific Item #9". The user-specific access metrics 408 are illustrative and non-limiting in nature, and depict the sort of granularity or resolution that may be achieved through analysis of clickstream data and stored as a part of the user access metrics 116. Therefore, other user-specific access metrics having other particular data types or degrees of precision can also be used.

The user-specific access metrics 408 include respective identifiers for a plurality of different users 104(1), 104(2), 104(3), actual access times for different visits, and numbers of elements rendered during each of the visits. For example, the user 104(1) has accessed the "Specific Item #9" webpage at least 3 times, spending 1 minute 45 seconds on the first access, 1 minute 36 seconds on the second access, and 4 seconds on the third access. Furthermore, all 5 of the intended elements were rendered during the first and second accesses, but only 4 of the 5 total elements were rendered on the third access. Similar data are also depicted for respective accesses by the users 104(2) and 104(3).

For instance, the user-specific access metrics 408 may indicate, or be interpreted, that the user 104(1) had considerable interest in the content of the "Specific Item #9" during the first 2 access, but much less interest during the third access—which may have been made in error while trying to find a different webpage, for instance. In response, an analysis module (e.g., 118) may be configured to disregard the 4 seconds access time value for the third access by the user 104(1) when calculating the average user access time for the "Specific Item #9" webpage. Other suitable operations may also be performed.

The data structure 400 illustrates just one of any number of such data structures that may be constructed or populated using the (granular) user access metrics 116 and then stored therewith. Such data structures may also be provided to the webpage generation module 110 for use in generating webpages or modifying the generation of predefined webpages, and so on.

Figure 5:
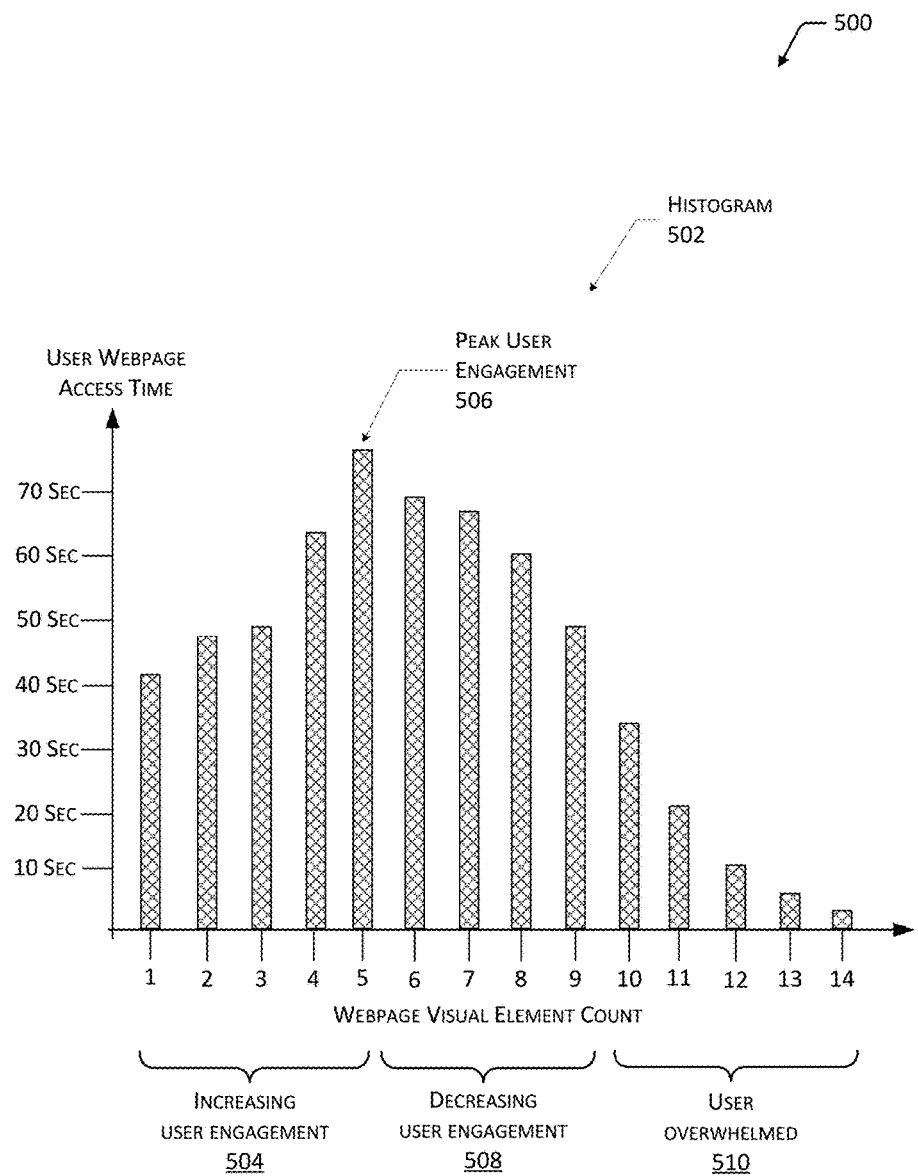
FIG. 5 is a histogram including webpage element counts correlated to user access (viewing) times.

FIG. 5 depicts views 500 of illustrative, correlated user access metrics. Specifically, the views 500 include respective element counts correlated to webpage access times for the particular user 104(3). The correlated data is depicted as a histogram 502. The specific values and characteristics of the histogram 502 are illustrative and non-limiting. Other histograms or presentation corresponding to user access metrics (e.g., 116) may also be constructed or used.

The histogram 502 includes 14 respective element counts and their corresponding user webpage access times. For example, the user 104(3) accessed a webpage having 1 element for just over 40 seconds, and accessed another webpage having 4 elements for about 65 seconds. An increasing user engagement range 504 spans the first 5 element count values, wherein a general trend is evident: the user 104(3) spent increasing amounts of time accessing (viewing) each respective webpage as the number of elements increased from 1 to 5. For purposes of example, it is interpreted that the user 104(3) interest level, or engagement, corresponds directly to time spent accessing a given webpage. Thus, as depicted by the histogram 502, user 104(3) engagement peaked at 5 elements, with an access time of about 77 seconds. This assumption is designed as peak user engagement 506.

A decreasing user engagement range 508 spans the next 4 element count values, where another general trend is depicted: the user 104(3) spent decreasing amounts of time accessing each respective webpage as the number of elements increased from 6 to 9. For purposes of the present example, it is interpreted that each successive increase in the number of elements leads to greater confusion on the part of the user 104(3). That is, it became increasingly difficult for the user 104(3) to meaningfully evaluate the merits of each element, or derive comparative conclusions between different elements, as the overall count increased. In short, webpages having increasing numbers of elements become less useful to the user 104(3), beyond a certain point (i.e., 5 elements).

A user overwhelmed range 510 spans the remaining 5 element counts, wherein the general trend depicted by the adjacent range 508 rapidly accelerates. Namely, the user 104(3) spent less and less time accessing each webpage as the respective element counts increases. In the case of element counts 12, 13 and 14, the respective user 104(3) access times were of such brevity as to conclude that little, if any, useful information or utility was conveyed. In a more extreme instance, the user 104(3) may even opt to exit (move on) from a particular webpage before all of the elements are fully rendered. In such an extreme case, the given webpage has essentially failed in its informational or other primary purpose and should be redesigned having a reduced element count in order to be effective for the particular user 104(3).

User access metrics 116 that are specific to a particular user may be analyzed to determine an element number of peak effectiveness (i.e., "optimized") for that user—in the foregoing example, the peak user engagement 506. Thereafter, the analysis module 118 may be configured to instruct the webpage generation module 110 to preferentially generate respective webpages (e.g., 120(3)) having 5 elements whenever the user 104(3) accesses the web server 108(1). In another example, such a user-specific peak effectiveness number may be used only when certain types of information or elements being presented—such as hand tools or articles of clothing in an online shopping venue. The principles illustrated in the histogram 502 may be analogously applied to user access metrics 116 spanning a multitude of different users (e.g., averaged or filtered data), and so on.

Figure 6:
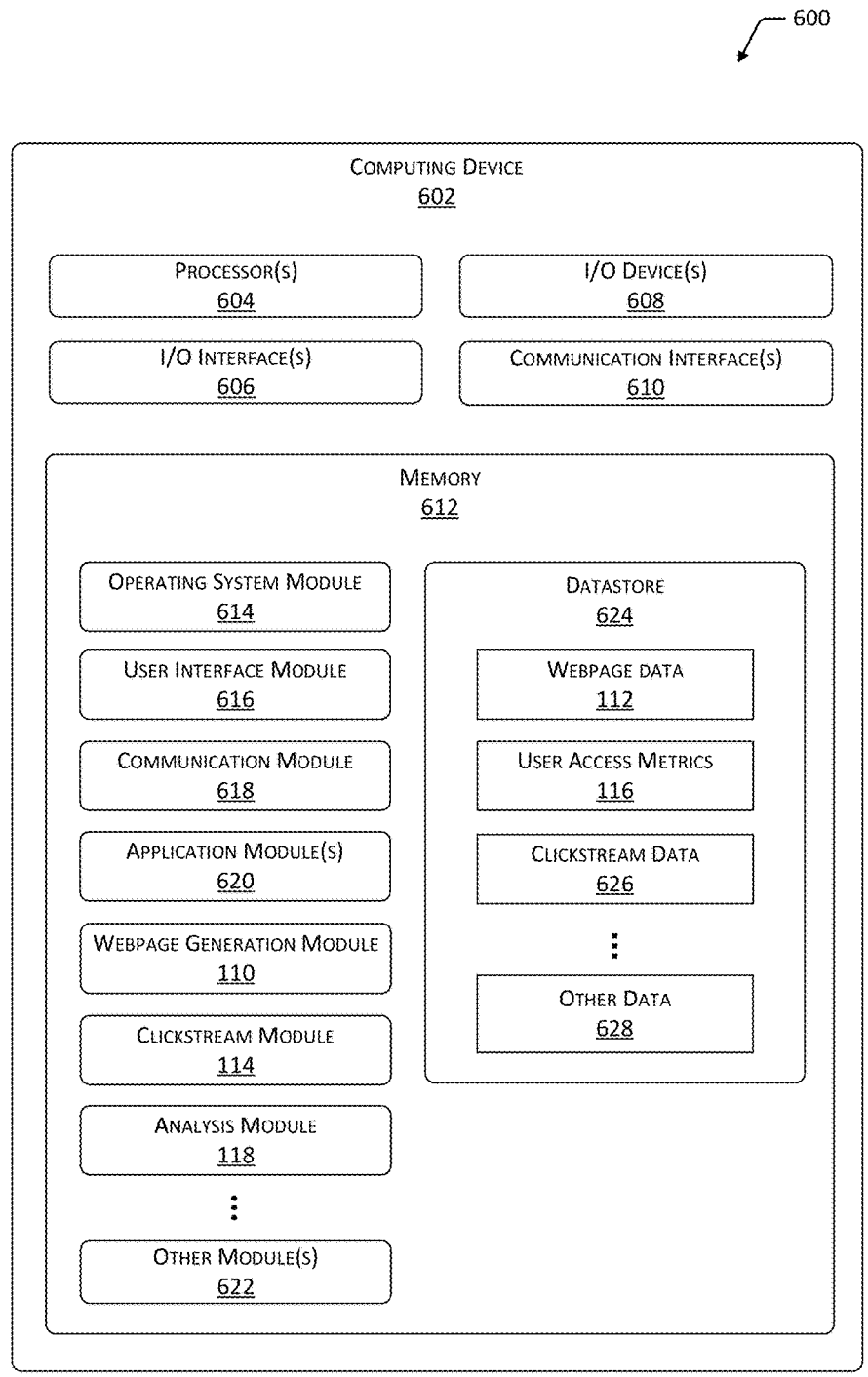
FIG. 6 is a block diagram of a web server and illustrative constituency.

FIG. 6 illustrates a block diagram 600 of a computing device 602. The computing device 602 may be any of the client devices 102, either of the web servers 108, or another suitable apparatus. Other computing devices 602 may include analogous or respectively varying constituency or configurations, accordingly. The computing device 602 may include one or more processors 604 configured to execute one or more stored instructions. The processor(s) 604 may comprise one or more cores. The computing device 602 may include one or more I/O interface(s) 606 to allow the processor(s) 604 or other portions of the computing device 602 to communicate with other devices, or the respective client devices 102, the web servers 108, and so on. The I/O interfaces 606 may comprise I2C, SPI, USB, RS-232, and so forth.

The I/O interface(s) 606 may couple to one or more I/O devices 608. The I/O devices 608 may include input devices such as one or more of a keyboard, mouse, and so forth. The I/O devices 608 may also include output devices such as one or more of a display, audio speakers, haptic output devices, and so forth. In some embodiments, the I/O devices 608 may be physically incorporated with the computing device 602, or may be externally placed.

The computing device 602 may also include one or more communication interfaces 610. The communication interfaces 610 are configured to provide communications between the computing device 602 and other computing devices, routers, access points, client devices, servers, and so forth. The communication interfaces 610 may include devices configured to couple to one or more networks including PANs, LANs, WLANs, WANs, and so forth. The computing device 602 may also include one or more busses or other internal communications hardware or software that allow for the transfer of data between the various modules and components of the web server 108(1).

As shown in FIG. 6, the computing device 602 includes one or more memories 612. The memory 612 comprises one or more CRSM. The memory 612 provides storage of computer readable instructions, data structures, program modules and other data for the operation of the computing device 602.

The memory 612 may include at least one operating system (OS) module 614. The OS module 614 is configured to manage hardware resource devices such as the I/O interfaces 606, the I/O devices 608, the communication interfaces 610, and provide various services to applications or modules executing on the processors 604. Also stored in the memory 612 may be one or more of the following modules. These modules may be executed as foreground applications, background tasks, daemons, and so forth.

A user interface module 616 may be configured to provide one or more application programming interfaces. The user interface module 616 may also provide data to the client devices 102(1)-102(3) that is configured to open or retrieve files, enable the rendering of webpages or their contents, or as needed for other operations, such as hypertext markup language ("HTML") files. The user interface module 616 is configured to accept inputs and send outputs using the I/O interfaces 606, the communication interfaces 610, or both.

A communication module 618 is configured to support communication with the client devices 102(1)-102(3), other client devices or entities, routers, and so forth, using the one or more networks 106. In some implementations the communication module 618 may support encrypted communications. For example, hypertext transport protocol secured ("HTTPS") or transport layer security ("TLS") may be supported.

The memory 612 may also include one or more application modules 620. The application modules 620 may be configured or modified, and selectively provided to other computing devices, to the client devices 102, and so on. Thus, various devices can be updated or enhanced as new application modules 620 are generated, existing application modules 620 are amended or improved, and so on.

The webpage generation module 110 may also be stored within the memory 612. The webpage generation module 110 is configured to generate one or more of the respective webpages 120(1)-120(3), or other user interfaces, using the webpage data 112. The webpage generation module 110 may generate such webpages in accordance with directives or data provided by the analysis module 118, using predefined webpages layouts or templates, and so on.

The memory 612 may also store the clickstream module 114. The clickstream module 114 is configured to parse, process, or otherwise evaluate clickstream (e.g., 308) data so as to identify or derive the various user access metrics 116. The clickstream module 114 is also configured to construct or populate one or more data structures (e.g., 400) using some or all of the user access metrics 116. The memory 612 may further store the analysis module 118. The analysis module 118 is configured to analyze the user access metrics using statistical, heuristic, filtering, pattern recognition, or other methods. The analysis module 118 is also configured to provide corresponding results of such analysis to the webpage generation module 110, store resulting data or metadata with the user access metrics 116, and so on. The memory 612 may also include other modules 622 respectively configured to perform other functions of the computing device 602.

The memory 612 may also include a datastore 624 to store data and information. The datastore 624 may use a flat file, database, linked list, tree, executable code, or other data structure to store the information. In some implementations, the datastore 624 or a portion of the datastore 624 may be distributed across one or more other devices including servers, network attached storage devices and so forth.

As depicted, the datastore 624 may store one or more of the webpage data 112, the user access metrics 116, or any combination of these, as previously described. The datastore 624 may also store clickstream data 626 as acquired, in whole or in part, by operation of the clickstream module 114. Clickstream data 626 may also be provided by one or more of the client devices 102(1)-102(3).

For example, the user 104(2) may login or otherwise initiate access to the web server 108(1), providing a unique user identity code in the process. This identity code can be stored in the clickstream data 626, along with other data or values received or detected as part of a distinct webpage access sequence of the user 104(2). The clickstream data 626 can then be processed by the clickstream module 114 immediately, at some future time, and so on, so as to supplement the user access metrics 116. Other data 628 may also be stored in the datastore 624. For example, the other data 628 may include client device 102(1)-102(3) communicational bandwidth values, characteristics or limitations of the respective client device 102(1)-102(3), account information, encryption keys, and so forth.

Figure 7:
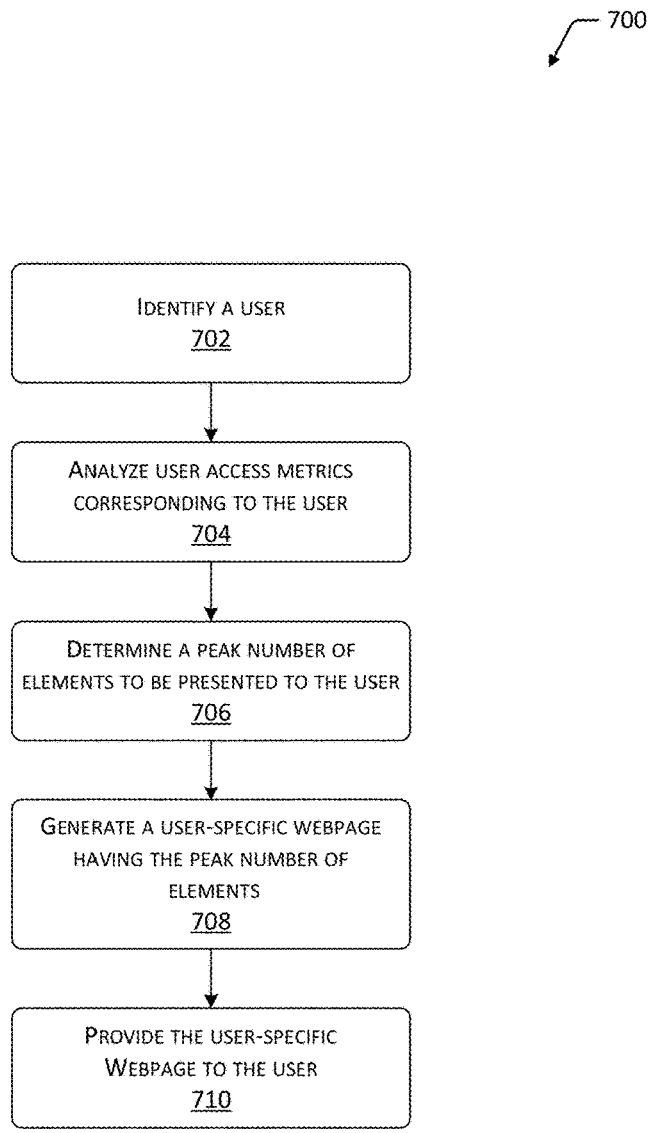
FIG. 7 is a flow diagram of an illustrative process of generating a user-specific webpage having a particular number of elements.

FIG. 7 is a flow diagram 700 illustrating a process including generating a webpage directed to a particular user. In some implementations, this process may be implemented by way of the client device 102(1), the web server 108(1), and the respective resources of each.

Block 702 identifies a user 104(1). For purposes of example, the user 104(1) begins an online shopping session by accessing the web server 108(1). The clickstream module 114 acquires an identifier for the user 104(1), such as an Internet Protocol (IP) address, login name, or other distinct number or token. Additionally, the user 104(1) initially accesses the "landing page" 302(1) and the content 302(2) thereof is rendered and presented using the client device 102(1). The user 104(1) then clicks on an "audio systems" link, indicating his intent to advance to webpage having that type of content next.

Block 704 analyzes user access metrics 116 corresponding to the user 104(1). In the present example, the analysis module 118 of the web server 108(1) accesses the user access metrics 116, retrieving user-specific access metrics 408 previously stored therein with respect to the user 104(1). The analysis module 118 may now analyze the corresponding user-specific access metrics 408 to determine user 104(1) access habits, identify likely interest areas, access times correlated to element counts, and so forth. In a case where few or no user access metrics 116 exist (yet) for a particular user 104, the analysis module 118 may resort to predefined default values. In another example, such default values are statistically evolving as additional clickstream data 626 is acquired and analyzed.

Block 706 determines a peak number of elements to be presented to the user 104(1). In the present example, the analysis module 118 reviews the user-specific access metrics 408 and determines that peak user engagement (e.g., 506) or "greatest likely viewing time" should occur if not more than 5 elements are presented to the user 104(1) in a webpage having audio equipment or related elemental content.

Block 708 generates a user-specific webpage 304(1) having the peak number of elements. In the present example, the analysis module 118 directs the webpage generation module 110 to generate the webpage 304(1) having not more than 5 elements for the user 104(1). The webpage generation module 110 then accesses the webpage data 112, retrieving textual information, digital photographs, or other elements so as to generate the webpage 304(1). It is noted that the sales promotion element 304(3) is included in the generated webpage 304(1) in accordance with the element count directive.

Block 710 provides the user-specific webpage 304(1) to the user 104(1). In the present example, web server 108(1) provides the user-specific webpage 304(1), having 5 elements total, to the client device 102(1). The client device 102(1) then fully renders the webpage 304(1) for the user, wherein all of the content 304(2) is presented and viewable. The user 104(1) then considers the respective elements of the webpage 304(1), including the sales promotion element 304(3), which is clicked on so as to advance (navigate) to another webpage having particular information regarding the sale.

In the immediate foregoing example, a user-specific (e.g., "custom") webpage 304(1) was generated for a particular user 104(1) based on prior user access metrics 116. The webpage 304(1) may be generated and provided in an essentially immediate or on-demand timeframe, with very little—if any—perceptible delay from the perspective of the user 104(1). Thus, webpages having specific element (e.g., 304(3)) counts, selected elements, or other characteristics may be constructed and provided with an expectancy of "peak" value or interest to the particular recipient.

Figure 8:
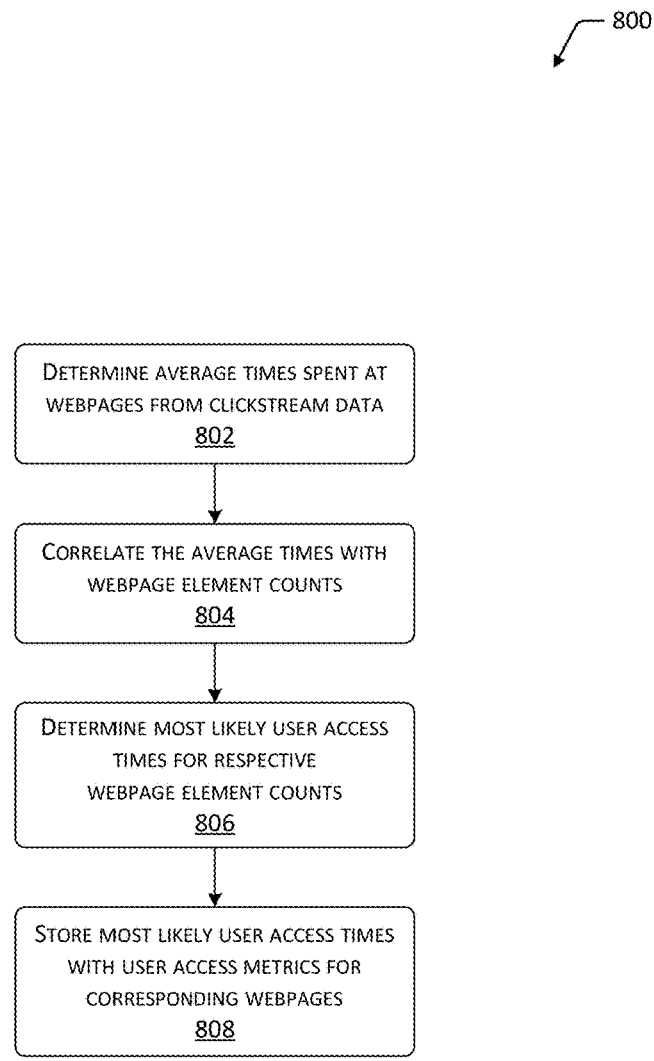
FIG. 8 is a flow diagram of an illustrative process of determining "most likely" access time values corresponding to particular element counts.

FIG. 8 is a flow diagram 800 illustrating a process including generating a webpage based on average user access information. In some implementations, this process may be implemented by way of the web server 108(1), and its respective resources.

Block 802 determines average times 406 that users (e.g., 104(1)-104(3)) spent at various webpages 402 using clickstream data 626. For example, the clickstream module 114 accesses previously stored clickstream data 626 and calculates average times 406 that a plurality of different users (e.g., 104(1)-104(3)) spent viewing (accessing) respectively different webpages 402. The average times 406 thus calculated may be used to populate the data structure 400.

Block 804 correlates the average times 406 with webpage element counts 404. In the present example, the clickstream module 114 uses the clickstream data 626 to correlate or "match-up" counts (i.e., numbers) 404 of elements with the average times 406 for those respective webpages 402. Thus, each webpage 402 has a corresponding element count 404 and an average (access or viewing) time 406. The element counts 404 may be used to populate the data structure 400. As depicted, the "Specific Item #1" webpage has an element count of 4 and an average (access) time of 1 minute 6 seconds (i.e., 1:06).

Block 806 determines most likely access times for respective element counts 404. In the present example, the analysis module 118 may access the data structure 400 and analyze the element counts 404 against the average times 406 so as to determine most likely (i.e., expected or anticipated) access times for an average user for webpages having respective element counts.

For instance, the analysis module 118 may analyze the data structure 400 and determine that respective webpages 402 having 4 elements range in average time 406 from 14 seconds (i.e., 0:14) to 2 minutes 9 seconds (i.e., 2:09). The analysis module 118 may also, for further illustration, disregard the extremes (0:14 and 2:09), and calculate an overall average of 1 minute 20 seconds (i.e., 1:20) for a hypothetical webpage having 4 elements. Similar operations may also be performed with respect to other webpages 402 having other respective element counts 404.

Block 808 stores the most likely access times with the user access metrics 116 for corresponding webpages 402. In the present example, the analysis module 118 matches (correlates) each of the respective most likely access times with a webpage or webpages 402 having the corresponding number of elements. The analysis module 118 then stores the most likely access times and the corresponding webpage 402 associations as a part of the user access metrics 116.

The user access metrics 116 now include respective pre-calculated "most likely" time values that may be used in determining the number of elements to be included when generating a webpage (e.g., 306(1)) at some later time. For example, a new user may access the web server 108(1), seeking information regarding a particular item of merchandise. The clickstream module 114 determines the "new user" status of this visitor and informs the analysis module 118 accordingly. In such a case, no prior user access metrics 116 for the new user are available to aid in generating a user-specific webpage. However, existing user access metrics 116 indicate that the average user accesses (views) visual content corresponding to that merchandise item for 1 minute 37 seconds (i.e., 1:37).

The analysis module 118 responds by applying the most likely access times data in a somewhat reciprocal manner: the average access time of 1:37 is matched as closely as possible to the pre-calculated most likely access times values. The analysis module 118 thus determines that 5 elements is the corresponding count for the closest most likely access time value (e.g., 1:35). The analysis module 118 then directs the webpage generation module 110 to generate a user-specific webpage (e.g., 120(3)) for the new user, including 5 elements related to the merchandise of interest.

Figure 9:
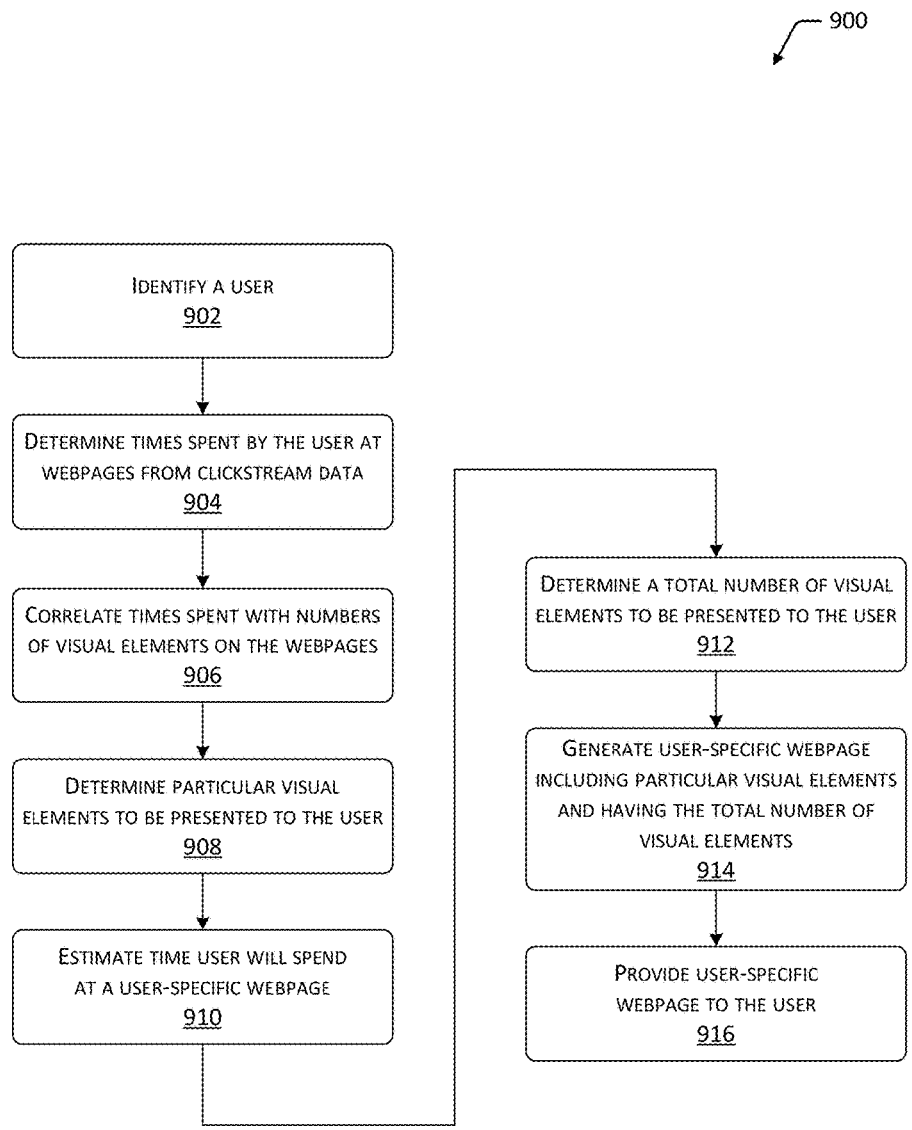
FIG. 9 is a flow diagram of an illustrative process of generating a user-specific webpage including particular elements and a particular element count.

FIG. 9 is a flow diagram 900 illustrating a process including generating a webpage based on average user access information. In some implementations, this process may be implemented by way of the web server 108(1), and its respective resources.

Block 902 identifies a user 104(1). For purposes of example, the user 104(1) accesses the web server 108(1). The clickstream module 114 acquires an identifier for the user 104(1), such as an Internet Protocol (IP) address, login name, or other information.

Block 904 determines times spent by the user 104(1) at respective webpages using clickstream data. In the present example, the user 104(1) accesses the webpages 302(1), 304(1) and 306(1), in that order, spending 12 seconds, 4 seconds, and 1 minute 6 seconds respectively, accessing these webpages. The clickstream 308 thus corresponds to the webpage 302(1)-306(1) access sequence taken by the user 104(1). The clickstream module 114 determines (detects, or acquires) the respective access times illustrated above and stores these with the clickstream data 626.

Block 906 correlates times spent with numbers of elements on the webpages 302(1)-306(1). In the present example, the clickstream module 114 correlates the respective times of 0:12, 0:04, and 1:06 with element counts of 13, 4, and 4, respectively, for the user 104(1) clickstream 308. These respective user-specific access metrics may then be stored with (or as) the user access metrics 116.

Block 908 determines particular elements to be presented to the user 104(1). In the present example, clickstream module 114 informs the analysis module 118 that the user 104(1) has clicked upon the sales promotion element 304(3), which was included on the webpage 306(1). The analysis module 118 accesses the webpage data 112 and the user access metrics 116 and identifies information regarding 2 particular items of merchandise that are presently on sale. Specifically, a pair of stereo headphones and a pair of compact speakers, which have not yet been presented to the user 104(1). Both of these merchandise items are related to the content 306(2) of the webpage 306(1). The analysis module 118 then flags or otherwise keeps track of these 2 merchandise items as the flow diagram proceeds.

Block 910 estimates the time the user 104(1) will spend at a user-specific webpage. The analysis module 118 now accesses the user access metrics 116 and determines (calculates), using newly acquired and past access metrics, how long the user 104(1) is likely to spend accessing a webpage provided specifically for him. For instance, the analysis module 118 may use pre-calculated most likely access time values, analogous to those calculated above in the flow diagram 800. Using these resources, the analysis module 118 determines that the user 104(1) is most likely to spend 1 minute 33 seconds (i.e., 1:33) viewing a sale promotional webpage yet to be generated.

Block 912 determines a total number of visual elements to be presented to the user 104(1). In the present example, the analysis module 118 uses the most likely access time of 1:33 against the user access metrics 116 to determine that 4 elements is a closest match to existing user metrics. The analysis module 118 then directs the webpage generation module 110 to generate a webpage including 4 elements total, and including element related to the 2 merchandise items determined in block 908.

Block 914 generates a user-specific webpage including particular visual elements and having the total number of elements. In the present example, the webpage generation module 110 accesses the webpage data 112 and retrieves 4 elements: respective digital photographs of the stereo headphone and compact speakers, and respective blocks of textual information describing the stereo headphones and the compact speakers. The webpage generation module 110 uses these 4 specific elements to generate a user-specific webpage (e.g., 120(1)).

Block 916 provides the user-specific webpage to the user 104(1). In the present example, the web server 108(1) provides (communicates) the user-specific webpage (e.g., 120(1)) to the client device 102(1) using the one or more networks 106. The client device 102(1) renders the user-specific webpage for viewing by the user 104(1). Thus, previously acquired or processed user access metrics 116 may be used with newly acquired clickstream data 626 in order to generate a user-specific webpage having an "optimized" number of elements specifically selected for a particular user.

The process of the flow diagram 900 is generally directed to generating a webpage specific (i.e., targeted) to a particular (i.e., individual) user. However, it is also contemplated that plural different users may have interests, goals, or other characteristics in common that are relevant to generating respective webpages. Thus, the process of the flow diagram 900—or other processes or methods described herein—may be used to generate and provide webpages having particular elements, element counts, and so on to a plurality of such users.

For example, the users 104(1)-104(3) may all be members of a particular athletics club. The web server 108(1) may be configured to generate webpages that are provided to such members. Accordingly, corresponding user access metrics 116 may be used to generate targeted webpages to be provided (presented) to the users 104(1)-104(3) when they respectively access the web server 108(1) seeking information or services regarding the athletics club. Such targeted webpages may draw upon idealized element counts, anticipated access times, and so forth.

Those having ordinary skill in the art will readily recognize that certain components, steps, or operations illustrated in in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium (CRSM) can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
   one or more memories storing computer-executable instructions; and
   one or more hardware processors configured to execute the computer-executable instructions to:
   determine a first set of elapsed times spent by users at a first user interface including a first count of elements;
   determine a second set of elapsed times spent by users at a second user interface including a second count of elements;
   generate a data structure associating the first set of elapsed times with the first count of elements and the second set of elapsed times with the second count of elements;
   determine a maximum time spent by the users;
   determine, based on the data structure, that the first count of elements is associated with the maximum time;
   in response to the first count of elements being associated with the maximum time, generate a third user interface including the first count of elements; and
   provide the third user interface to a user device for output.

2. The system of claim 1, further comprising computer-executable instructions to:
   determine particular elements included in the first count of elements;
   generate the data structure to further associate the first set of elapsed times with the particular elements;
   determine one or more of the particular elements associated with the maximum time spent by the users; and
   generate the third user interface to further include at least a subset of the one or more of the particular elements within the first count of elements.

3. The system of claim 1, further comprising computer-executable instructions to:
   determine one or more of sizes or colors of elements associated with the first count of elements;
   generate the data structure to further associate the first set of elapsed times with the one or more of the sizes or colors of elements;
   determine one or more particular sizes or colors of elements associated with the maximum time spent by the users; and
   generate the third user interface to further include at least a subset of the one or more particular sizes or colors of elements.

4. The system of claim 1, further comprising computer-executable instructions to:
   determine one or more of client device types or access bandwidths associated with access bar the users at the first user interface;
   generate the data structure to further associate the first set of elapsed times with the one or more of the client device types or access bandwidths; and
   wherein the first count of elements is further determined based at least partly on the one or more of the client device types or access bandwidths in the data structure.

5. A method comprising:
   determining a first set of times spent by users at a first user interface, including a first count of elements;
   determining a second set of times spent by users at a second user interface including a second count of elements;
   generating a data structure associating the first set of times with the first count of elements and the second set of times with the second count of elements;
   determining a target time to be spent by users at a third user interface;
   determining, based on the data structure, that the first count of elements corresponds to the target time; and generating the third user interface including the first count of elements.

6. The method of claim 5, further comprising accessing clickstream data indicative of the first set of times spent by the users at the first user interface.

7. The method of claim 5, further comprising:
determining one or more of a device type or an access bandwidth associated with access by the users at the first user interface, wherein the target time is determined based at least partly on the one or more of the device type or the access bandwidth.

8. The method of claim 5, further comprising:
determining particular elements included in the first user interface;
determining one or more particular elements that correspond to the target time; and
generating the third user interface to further include at least a subset of the one or more particular elements.

9. The method of claim 5, further comprising:
determining one or more of: user access metrics, client device types, or access bandwidths associated with one or more of the users at the first user interface or the users at the second user interface; and
wherein the target time to be spent by the users at the third user interface is determined at least in part using the one or more of the user access metrics, the client device types, or the access bandwidths.

10. The method of claim 5, further comprising:
determining a respective count of elements rendered before the users navigated away from the first user interface after a respective viewing time;
determining the target time to be less than or equal to the respective viewing time; and
generating the third interface to include the first count of elements, wherein the first count of elements is less than or equal to the respective count of elements.

11. The method of claim 5, wherein determining the target time to be spent by the users at the third user interface includes determining a maximum viewing time.

12. The method of claim 5, further comprising:
determining an identity of a user accessing the third user interface;
determining user access metrics associated with the identity;
determining, based at least in part on the user access metrics, one or more particular elements that correspond to the target time; and
generating the third user interface to further include at least a subset of the one or more particular elements.

13. A system comprising:
one or more memories storing computer-executable instructions; and
one or more hardware processors configured to execute the computer-executable instructions to:
determine first user access metrics indicative of a first set of times spent by a user at a first user interface including first user interface characteristics;
determine second user access metrics indicative of a second set of times spent by the user at a second user interface including second user interface characteristics;
generate a data structure that associates the first user interface characteristics with the first set of times and the second user interface characteristics with the second set of times;
determine a target time to be spent by the user at a third user interface;
determine, based on the data structure, that the first user interface characteristics that correspond to the target time;
generate the third user interface including the first user interface characteristics; and
provide the third user interface to a device associated with the user.

14. The system of claim 13, further comprising computer-executable instructions to:
determine one or more of a device type or access bandwidth associated with the device;
wherein the target time is determined based at least partly on the one or more of the device type or the access bandwidth.

15. The system of claim 13, further comprising computer-executable instructions to:
determine one or more particular elements accessed by the user that correspond to the target time; and
generate the third user interface to further include at least a subset of the one or more particular elements.

16. The system of claim 13, the system further comprising computer-executable instructions to:
determine a particular viewing time that lapsed before the user navigated away from one or more of the first user interface or the second user interface; and
determine the target time to be less than or equal to the particular viewing time.

17. The system of claim 13, further comprising computer-executable instructions to:
determine a particular count of elements rendered in one or more of the first user interface or the second user interface before the user navigated away from the one or more of the first user interface or the second user interface; and
generate the third user interface to include a count of elements less than or equal to the particular count of elements.

18. The system of claim 13, wherein the first user interface characteristics include one or more of: a count of elements presented in the first user interface; a size of one or more of the elements; or a color of one or more of the elements.

19. The system of claim 13, wherein the computer-executable instructions to determine the target time include computer-executable instructions to determine a maximum viewing time.

20. The system of claim 13, further comprising computer-executable instructions to:
determine a target count of elements for the third user interface;
determine a particular time corresponding to access of the first user interface having the target count of elements; and
determining the target time to be greater than or equal to the particular time.

* * * * *

UNITED STATES PATENT AND TRADEMARK OFFICE
CERTIFICATE OF CORRECTION

PATENT NO. : 10,180,848 B1
APPLICATION NO. : 14/952596
DATED : January 15, 2019
INVENTOR(S) : Nima Sharifi Mehr It is certified that error appears in the above-identified patent and that said Letters Patent is hereby corrected as shown below:

In the Claims

Column 18, Line 47:
Reads "access bar the user"
When it should read "access by the user"

Signed and Sealed this
Twelfth Day of March, 2019

Andrei Iancu
*Director of the United States Patent and Trademark Office*